No. 859,453.

PATENTED JULY 9, 1907.

L. KUNZ.
SACCHARIMETER.
APPLICATION FILED FEB. 23, 1907.

Witnesses:

Inventor
Ludwig Kunz
By his Attorney

UNITED STATES PATENT OFFICE.

LUDWIG KUNZ, OF NEW YORK, N. Y.

SACCHARIMETER.

No. 859,453.

Specification of Letters Patent.

Patented July 9, 1907.

Application filed February 23, 1907. Serial No. 359,012.

*To all whom it may concern:*

Be it known that I, LUDWIG KUNZ, a subject of the Emperor of Austria, and a resident of New York, county and State of New York, have invented certain new and useful Improvements in Saccharimeters, of which the following is a specification.

The present invention pertains to an instrument known under the name of saccharimeter, that is used in breweries to measure the extract contained in the wort. It particularly pertains to improvements on the hitherto used Balling saccharimeter. Balling's saccharimeter is used in breweries for estimating the amount of extract contained in wort, or beer and shows the number of pounds of extract in hundred pounds of wort. Since, however, the wort produced in a brewery is everywhere measured by volume, i. e., by the barrel and not by the weight, the extract contained in a barrel of wort must be computed when it is desired to ascertain the yield, i. e., the amount of extract, obtained from the mashing materials. This calculation being troublesome, I found it advantageous to furnish the instrument with an additional scale on which the number of pounds of extract contained in a barrel of wort can be easily read off.

Figure 1:
Figure 2:
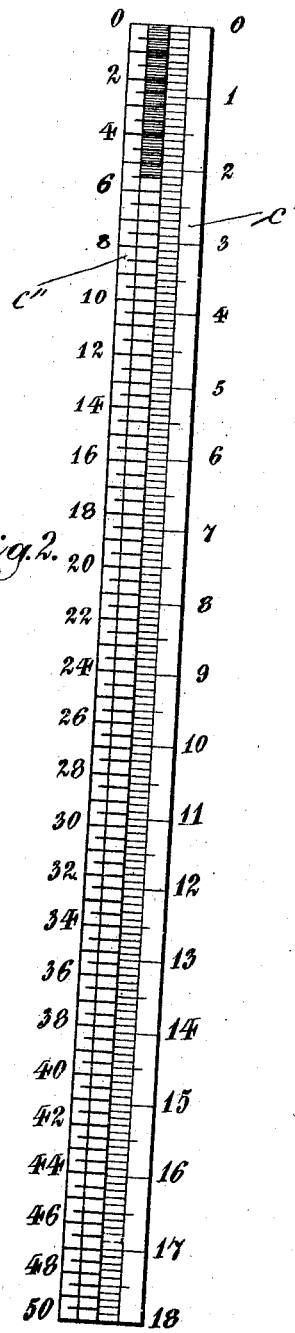

To make my invention more clear, the same is illustrated in the accompanying drawing, in which similar reference letters denote corresponding parts, and in which Figure 1 shows the construction of the saccharimeter, and Fig. 2 a diagram of the new scale as combined with the Balling scale.

With reference to the drawing, $a$ denotes the saccharimeter which is of the usual construction. The lower scale $b$ denotes the thermometer scale for measuring the temperature and $c$ denotes the new scale combined with the Balling scale. As will be seen from Fig. 2, my new scale $c$ consists of the Balling scale $c'$ on the right hand side, and the scale $c''$ on the left hand side. In practice the Balling scale will be shown in black, while the yield scale will be shown in red.

My new scale is based on the following formula: The water-weight of a barrel is equal to 258.5 pounds. By multiplying this constant amount with the specific gravity of the wort, we get the weight of a barre of wort. The Balling scale as mentioned, shows the number of pounds of extract contained in 100 pounds of wort. If we thus multiply the weight of wort by the figure shown on Balling's scale, and divide by 100 we obtain the number of pounds of extract contained in the barrel. The formula according to which my new scale is built up, reads thus as follows:

$$\frac{258.5 \times \text{specific gravity} \times \text{Balling scale}}{100} = \text{lbs. extr. in barrel.}$$

The pound indications on my new scale are divided into tenths, so that the tenths of pounds which correspond to about 3/100 percent. Balling, can be readily read off.

With the aid of the new scale, the calculation of the yield, which is one of the most important control work in breweries, becomes very simple and accurate. For instance, if the pound scale indicates 38.3 (= to about 14 percent. Balling), and the quantity of cold wort is 190 barrels, the total extract obtained is: $38.3 \times 190 = 7277$ lbs.

If it is desired to find out what percentage of the mashing materials the extract represents, the sum total of the extract is to be divided by the 100 weight of the mashing material used, thus:

$$\frac{\text{lbs. scale} \times \text{barrels}}{100 \text{ weight of mashing material}} = \text{yield.}$$

Suppose that the mashing material amounts to 10,700 lbs., the yield expressed in percent. is:

$$\frac{38.3 \times 190}{107} = 68.0 \text{ percent.}$$

Presuming that the same quantity of mashing material is used for every brew, and that where raw materials are employed, they are always added in the same proportions as is generally the case, it suffices for the daily control of the brewhouse work, and of the extract yield obtained from the mashing materials, to determine the total amount of extract obtained. According to the example given, the 10,700 lbs. mashing materials yielded 7,277 lbs. total extract. If, with the next brew, the new scale indicates 38.6 (= to about 14.1 per cent. Balling) and 191 barrels are brewed on that occasion, the quantity of total extract would be $38.6 \times 191 = 7372.6$ lbs. indicating an increase of $7373.6 - 7277.0$ lbs. $= 95.6$ lbs. of extr. over the previous brew. Supposing that the mashing material had been the same in both cases, the results show that the brewhouse work was more profitable in connection with the second brew since in that instance the mashing material yielded 95.6 pounds more extract than was obtained in the previous brew. This kind of control is preferred in many breweries as all deviations in the total extract are expressed in lbs., therefore, more clearly than when stated in percentages. Expressed in percent., the yield in the second instance would be:

$$\frac{38.6 \times 191}{107} = 68.90 \text{ percent.}$$

Compared with the first example in which the yield was 68 percent., the second example shows an increase of 0.9 percent. equal, as stated before, to 95.6 lbs. extract. This shows that any increase or decrease in the yield becomes much more evident when expressed in pounds extract.

What I claim and desire to secure by Letters Patent is:—

The herein described saccharimeter having two sets of graduations representing the Balling scale and the yield scale respectively, the graduations of the latter denoting pounds extract in barrels and being obtained by the formula: $258.5 \times$ specific gravity of the wort $\times$ Balling scale $\div 100$ in which 258.5 is the water weight of a barrel.

Signed at New York this 20 day of February 1907.

LUDWIG KUNZ.

Witnesses:
JOSEPH E. CAVANAUGH,
MAX I. ORDMANN.